(12) United States Patent
Hoefer et al.

(10) Patent No.: US 8,608,459 B2
(45) Date of Patent: Dec. 17, 2013

(54) VACUUM PUMP

(75) Inventors: Ulrike Martina Hoefer, Worthing (GB); Barrie Dudley Brewster, Brighton (GB); Andrew Waye, Forest Row (GB)

(73) Assignee: Edwards Limited, West Sussex (GB)

( * ) Notice: Subject to any disclaimer, the term of this patent is extended or adjusted under 35 U.S.C. 154(b) by 823 days.

(21) Appl. No.: 12/316,292

(22) Filed: Dec. 11, 2008

(65) Prior Publication Data

US 2009/0162220 A1 Jun. 25, 2009

(30) Foreign Application Priority Data

Dec. 20, 2007 (GB) .................................. 0724837.0

(51) Int. Cl.
*F04B 17/00* (2006.01)
*F04B 35/04* (2006.01)
*H02K 29/06* (2006.01)
*H02P 6/00* (2006.01)

(52) U.S. Cl.
USPC .................................. 417/410.1; 318/400.32

(58) Field of Classification Search
USPC .................................. 417/410.1; 318/400.32
See application file for complete search history.

(56) References Cited

U.S. PATENT DOCUMENTS

| | | | |
|---|---|---|---|
| 5,394,041 A | 2/1995 | Oberdorfer-Bögel | |
| 6,236,183 B1 | 5/2001 | Schroeder | |
| 6,664,683 B1 | 12/2003 | Yashiro et al. | |
| 2005/0118014 A1* | 6/2005 | Olivier et al. | 415/90 |
| 2007/0278983 A1* | 12/2007 | Clothier et al. | 318/701 |
| 2008/0129243 A1* | 6/2008 | Nashiki | 318/701 |
| 2009/0134734 A1 | 5/2009 | Nashiki | |

FOREIGN PATENT DOCUMENTS

| | | |
|---|---|---|
| EP | 1 189 335 A2 | 3/2002 |
| EP | 1 189 335 A3 | 3/2003 |
| EP | 1505719 A2 | 9/2005 |
| EP | 1705792 A1 | 9/2006 |
| GB | 1 011 479 | 12/1965 |
| JP | 08084493 | 3/1996 |
| JP | 2000220640 A | 8/2000 |
| JP | 2002031082 A | 1/2002 |
| JP | 2003153514 A | 5/2003 |
| JP | 2003174794 A | 6/2003 |
| JP | 2003-274625 | 9/2003 |
| JP | 2003274625 A | 9/2003 |
| WO | 98/11662 | 3/1998 |
| WO | 99/41829 | 8/1999 |
| WO | 2005/1113986 A1 | 12/2005 |

OTHER PUBLICATIONS

Toyama Katsuhisa, English language abstract of Japanese Publication JP2003274625 A, "DC Brushless Motor and Turbo-Molecular Pump,".
Mitsubishi Heavy Ind Ltd, Sep. 26, 2003.
United Kingdom Search Report mailed Apr. 23, 2008 for Application No. GB0724837.0; Claims searched: 1-14; Date of search: Apr. 22, 2008.

(Continued)

*Primary Examiner* — Anh Mai
*Assistant Examiner* — Zachary J Snyder
(74) *Attorney, Agent, or Firm* — Westman, Champlin & Koehler, P.A.; Theodore M. Magee (57) ABSTRACT

A vacuum pump having a vacuum pumping mechanism mounted for rotation by a shaft and a brushless motor for rotating the shaft where the vacuum pumping mechanism comprises a turbo pumping mechanism comprising pumping stages, and a molecular drag pumping mechanism comprising at least one pumping stage, and a shaft supported for rotation by bearings, and where the motor comprises a permanent magnet rotor fixed relative to the shaft and the rotor has four poles and a stator has non-overlapping stator coils.

17 Claims, 7 Drawing Sheets

(56) References Cited

OTHER PUBLICATIONS

European Search Report from corresponding European Application No. EP08170560, dated Oct. 23, 2012.

Prosecution history of corresponding Chinese Application No. 200810183984.6 including: First Office Action dated Dec. 20, 2011 and Response dated May 4, 2012.

Prosecution history of corresponding European Application No. 08170560.0-1267 including: Response dated May 28, 2013.

Prosecution history of corresponding Japanese Application No. 2008325565 including: First Office Action dated Aug. 2011; Second Office Action dated Aug. 2012; Response dated Oct. 30, 2012; Response dated Nov. 12, 2012; Response dated Jan. 30, 2012; Response dated Feb. 25, 2013; Response dated Feb. 27, 2013.

* cited by examiner

VACUUM PUMP

FIELD OF THE INVENTION

The invention relates to a vacuum pump.

BACKGROUND TO THE INVENTION

Turbo, Siegbahn, Holweck and Gaede are known vacuum pumping mechanisms. Such mechanisms are driven by a motor which causes rotation about an axis. It is often desirable to provide a vacuum pump which is compact in size and in order to achieve a compact design, the motor is positioned differently relative to the various different types of pumping mechanisms in order to increase the efficient use of space inside the pump. For instance, as shown schematically in FIG. 8, a Holweck pumping mechanism comprises at least one cylinder 80 rotatable about an axis 82. A space is provided radially inward of the cylinder in which a motor 84 may be positioned provided that the outer diameter of the motor is constrained so that it fits within the space. As the Holweck cylinder is relatively long, an axial length of the motor is relatively less constrained. As shown schematically in FIG. 9, a Gaede or Siegbahn pumping mechanism comprises at least one disk 86 rotatable about the axis 82. Typically, a motor 88 for such mechanisms is positioned on one axial side of the mechanism and therefore, it is desirable to limit the axial length of the motor in order to conserve space in the pump. Conversely, a radial dimension of a motor for a Gaede or Siegbahn mechanism is relatively less constrained.

Motors for vacuum pumps are either constrained in axial or radial dimension according to the type of pumping mechanism with which they are used, and therefore it is necessary to provide two different types of motor. A motor of a compact size is desirable for use with both Holweck type and Siegbahn and Gaede types of vacuum pumping mechanisms.

Figure 10:
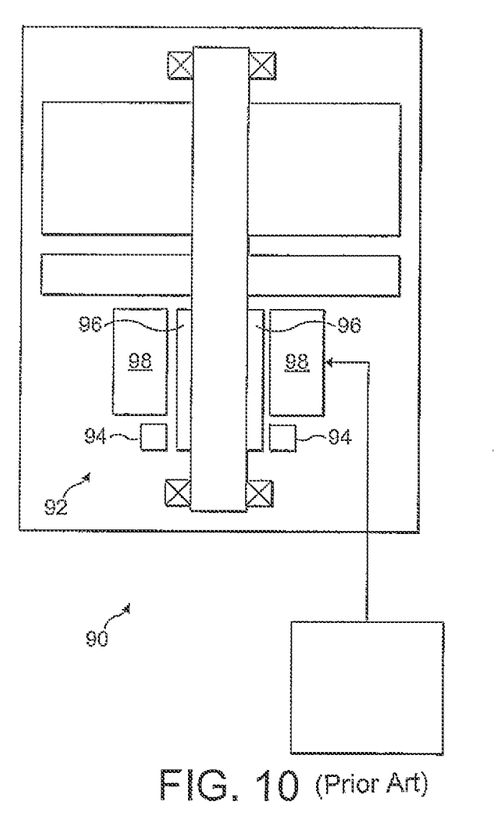
FIG. 10 is a schematic diagram of a prior art vacuum pump.

Vacuum pumps may be used with scientific or manufacturing equipment which is sensitive to magnetic interference. Such equipment includes electron microscopes, focused ion beam instruments and lithography equipment. Turbomolecular pumps of the types described above are often used to achieve the high vacuum typically required in such equipment. A Turbomolecular pump 90 is shown in FIG. 10. Such pumps are designed for high rotational speeds in the region of 36,000 to 90,000 rpm and may be driven by a permanent magnet brushless DC motor 92. Such motors have a two-pole configuration in order to minimise the commutation frequency and simplify the design of the drive electronics. Brushless DC motors generally comprise one or more hall effect sensors 94 for sensing rotation of a permanent magnet rotor 96. The rotor 96 extends axially beyond an end of the stator 98 so that the sensors can measure the rotation of the rotor. The extension of the rotor causes increased stray magnetic fields to leak out of the pump and interfere with scientific or manufacturing equipment, even though typically the extension may be only around 5 mm. It is desirable to reduce magnetic interference from the motor.

SUMMARY OF THE INVENTION

The invention provides a vacuum pump comprising a vacuum pumping mechanism rotatable by a shaft and a brushless motor for rotating said shaft, wherein said motor comprises: a permanent magnet rotor fixed relative to said shaft, said rotor having at least four poles; a stator fixed relative to a pump housing, said stator having non-overlapping stator coils; and motor control means for selective energisation of said stator coils dependent on a relative position of said rotor and said stator so that said rotor can be rotated relative to said stator.

Other preferred and/or optional features are defined in the accompanying claims.

BRIEF DESCRIPTION OF THE DRAWINGS

In order that the invention may be well understood, an embodiment thereof, which is given by way of example only, will now be described with reference to the drawings in which.

DETAILED DESCRIPTION OF THE ILLUSTRATED EMBODIMENT

Figure 1:
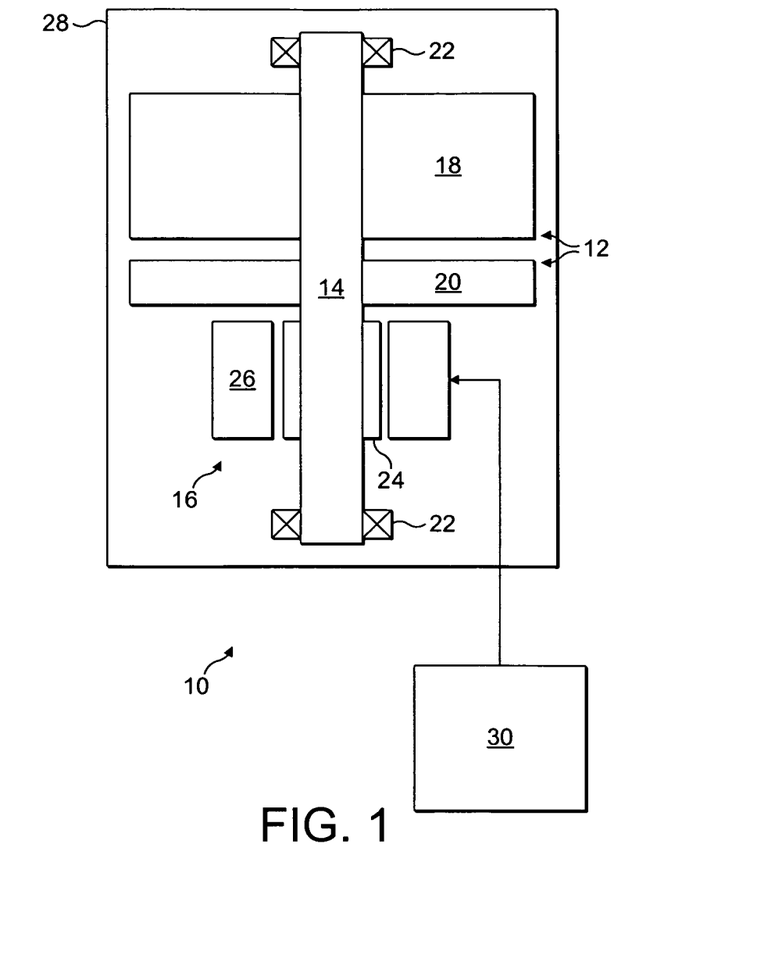
FIG. 1 is a schematic diagram of a vacuum pump.

Referring to FIG. 1, a vacuum pump 10 is shown, which comprises a vacuum pumping mechanism 12 mounted for rotation by a shaft 14 and a brushless motor 16 for rotating the shaft. The vacuum pumping mechanism 12 comprises a turbo pumping mechanism 18 comprising a plurality of pumping stages, and a molecular drag pumping mechanism 20 comprising at least one pumping stage. Shaft 14 is supported for rotation by bearings 22.

The vacuum pumping mechanism may comprise any one or more types of turbomolecular pumping mechanisms, for instance and without limitation, turbo, Gaede, Siegbahn or Holweck type mechanisms. As shown in FIG. 1, turbo and Siegbahn mechanisms are shown.

Vacuum pumping mechanisms require rotation at high speed, typically at speeds of at least 20,000 rpm and generally at speeds of between about 36,000 and 90,000 rpm. Such high speeds are necessary to achieve compression from pressures of about $1 \times 10^{-10}$ Torr at an inlet of the pump and 1 Torr at an outlet of the pump. Vacuum pumps are considered therefore to be very high speed pumps.

The motor 16 comprises a permanent magnet rotor 24 fixed relative to the shaft 14. The rotor 24 has four poles as will be described in greater detail below with reference to FIG. 2. More than four poles may be adopted as required. The motor comprises a stator 26 fixed relative to a pump housing 28. The stator has non-overlapping stator coils, which are also described in greater detail below with reference to FIG. 2.

A motor control 30 is operable for commutation of the motor by selective energisation of the stator coils dependent on a relative position of the rotor 24 and the stator 26 so that the rotor can be rotated relative to the stator for driving the pumping mechanism 12. The motor control 30 is described in greater detail below with reference to FIG. 5. The motor control 30 is configured to control selective energisation of the stator coils without a sensor, such as a hall effect or other magnetic field based sensors. Accordingly, the rotor 24 is not required to extend beyond the stator 26 as shown in FIG. 10 to allow such sensors to function. As a consequence, stray magnetic fields encountered with prior art brushless motors are reduced with the arrangement shown in FIG. 1 and therefore, vacuum pump 10 is more suitable for use with scientific or manufacturing equipment which is sensitive to magnetic interference.

Figure 2:
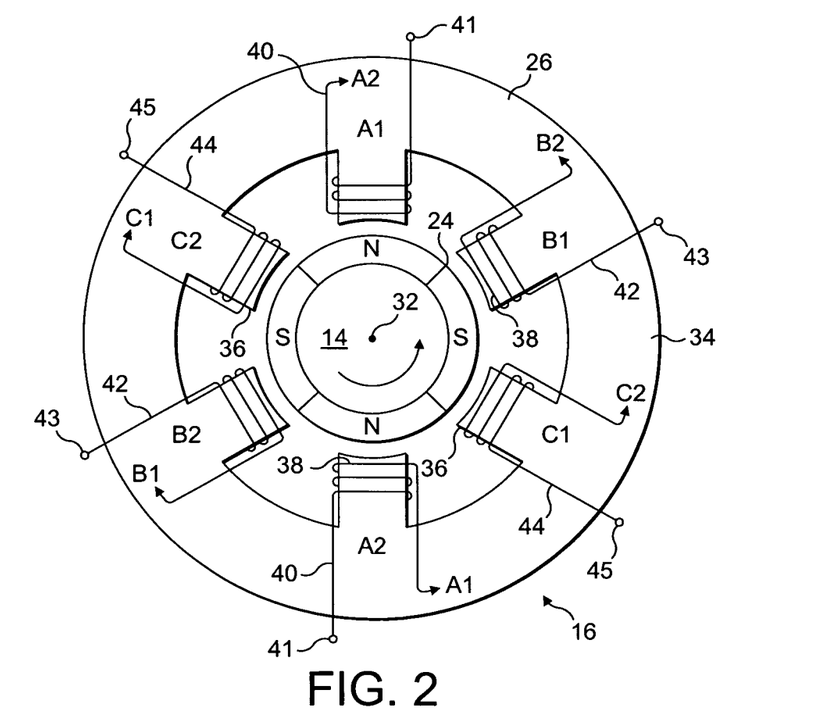
FIG. 2 is a view of an axial end of a motor for the vacuum pump shown in FIG. 1.

An axial end of motor 16 is shown in FIG. 2. The rotor 24 is generally cylindrical having a radially inner surface which is fixed to a radially outer surface of shaft 14 for rotation about an axis 32. The rotor has four generally equal arcuate segments or, if the rotor is of unitary construction, four generally equal arcuate rotor portions, which constitute four poles of the rotor. The north and south poles are arranged alternately around the rotor, each pole extending over no more than 90° about axis 32. Whilst four poles are shown in FIG. 2, more than four poles can be adopted as required.

Stator 26 is fixed by suitable means relative to pump housing 28. The stator has a core with a generally annular peripheral portion, or back-iron, 34 from which six pole shoes 36 extend radially inwardly. The pole shoes are angularly spaced generally equally about the peripheral portion 34 at an angle of about 60°. The radially inner face of each shoe 36 is spaced from a radially outer surface of rotor 24 by an air-gap in which magnetic flux is controlled by operation of the stator in order to control rotation of the rotor.

Although the embodiment shown comprises a three phase motor having four pole rotor and six stator shoes, other combinations of phases, poles and shoes fall within the scope of the present invention. For instance, the motor may comprise any even number of poles equal to or greater than four (4, 6, 8, 10 etc). However, there are disadvantages associated with a multiplicity of poles as this leads to high commutation frequencies which involve complex and expensive processing requirements. Such high frequencies may also generate unacceptable losses within the motor. More or less than three phases may be provided as required, however at least three phases are preferred for providing smooth torque distribution. Where P is the number of poles and M is the number of phases, the number of shoes must be equal to or greater than P/2×M.

The stator winding comprises three wires configured to form six non-overlapping stator coils 38. The six stator coils are wound about respective pole shoes 36, as indicated at A1, B1, C1, A2, B2, C2. A first wire 40 is connected between electrical contacts 41 and forms stator coils at A1 and A2. A second wire 42 is connected between electrical contacts 43 and forms stator coils at B1 and B2. A third wire 44 is connected between electrical contacts 45 and forms stator coils at C1 and C2. Electrical contacts 41, 43, 45 are connected to frequency converter 60 described hereinafter. As shown by the arrows in FIG. 2, each of the first, second and third wires extend over the axial end of stator core portion 34 between respective coils A1 and A2, B1 and B1, and C1 and C2. The axial length of the stator is determined by a length of peripheral portion 36 and an axial extent of the windings which protrude beyond each axial end face of portion 36. Additionally, wires 40, 42, 44 extend over the end face of the core and therefore may further extend the axial extent of the stator.

Figure 3:
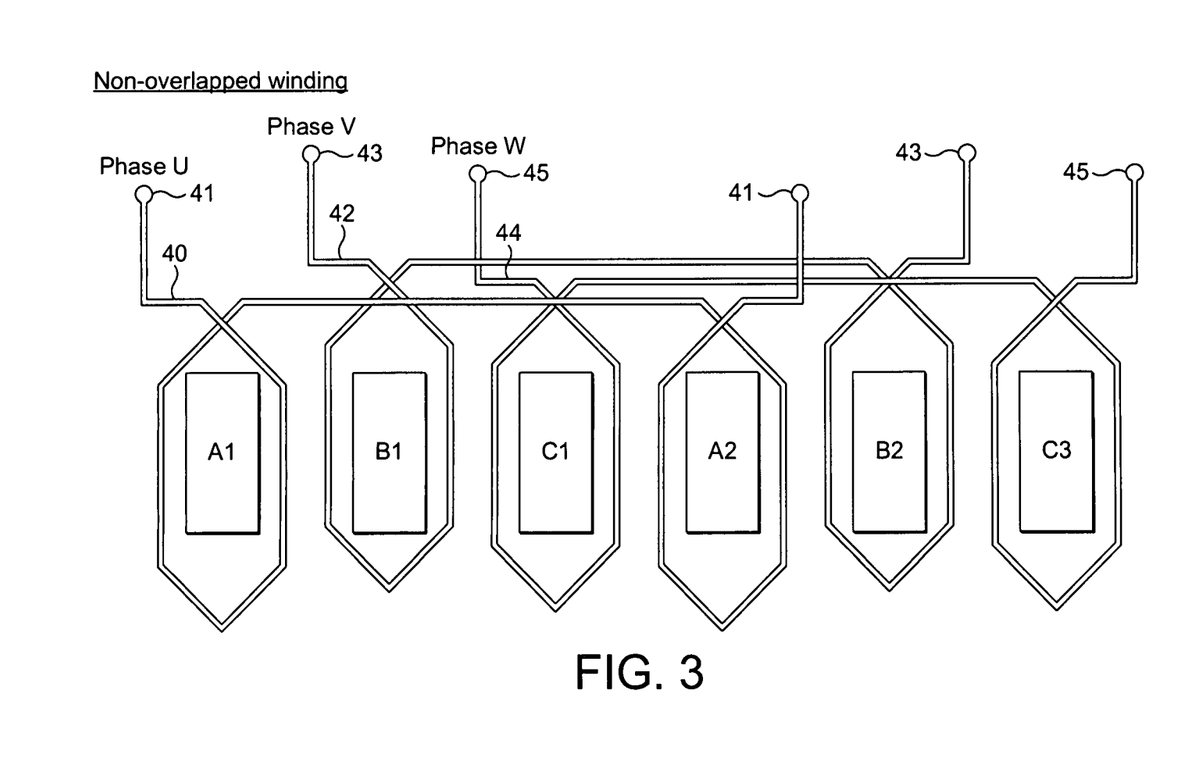
FIG. 3 is a simplified representation of a winding arrangement for the motor shown in FIGS. 1 and 2.
Figure 4:
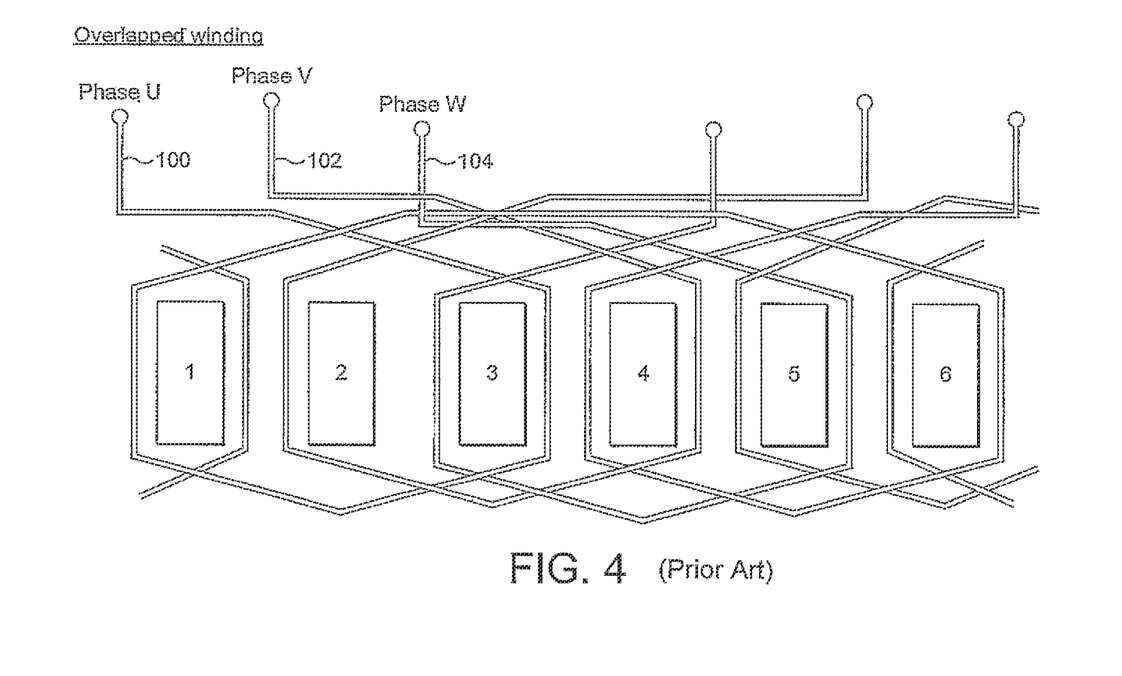
FIG. 4 is a simplified representation of a winding arrangement for a prior art motor.

FIG. 3 shows the non-overlapping winding arrangement of FIG. 2, and FIG. 4 shows a prior art overlapping arrangement. In FIG. 3, the non-overlapping stator windings can be wound in-situ and occupy less space in an axial and/or circumferential direction of the motor as compared to overlapping windings. In this regard, the space required around and at an axial end of each pole shoe is less for a non-overlapping winding since only one coil is wound around each shoe. Additionally, an overlapping winding arrangement can not be wound in-situ but instead requires a relatively complicated and time consuming winding technique. If a non-overlapping winding arrangement is adopted as in the present invention it is further possible to provide a stator with a segmented stator core. Generally, in such a stator core, each segment comprises one pole shoe and the winding can readily be made prior to integration of segments to form the stator. It is a further advantage in a segmented stator that the stator can be made from a non-sintered composite powder material using standard powder metallurgy processes. Each segment of such a stator can be moulded/cast such that the axial end of the pole shoe is spaced from an axial end of the back-iron (peripheral portion 34) to provide a space for the winding, so that when a winding is formed on the pole shoe the windings do not extend beyond either axial end of the back iron. It will be appreciated therefore that non-overlapping windings have a relatively uncomplicated configuration which is more easily manufactured and allows a reduction in axial and/or radial extent of the stator compared to the prior art configuration shown in FIG. 4. In FIG. 4, the windings 102, 104, 106 are more difficult to manufacture and are not capable of being formed in-situ or in combination with a segmented stator. Further, such windings occupy relatively more space around each of the pole shoes increasing a diameter of the motor and also such windings have a greater overhang in an axial direction relative to the back-iron increasing an axial length of the stator.

Figure 5:
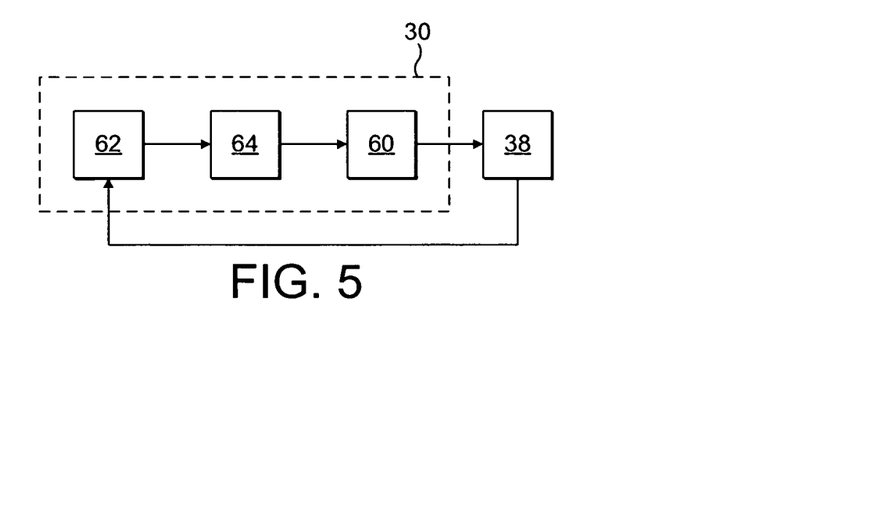
FIG. 5 shows a motor control means for the motor shown in FIGS. 1 and 2.

FIG. 5 shows the motor control means 30. The motor control means is operable to control energisation of the stator coils at A1 and A2, B1 and B2, and C1 and C2 to provide three phase commutation. The motor control means 30 determines a relative angular position of the rotor and the stator by measuring a voltage and current in the stator windings and controls energisation of the stator windings to provide correct commutation. EP0925641, EP1189335 and EP1705792 each show control means for commutating a motor without the use of a sensor and the content of each of those applications is incorporated herein by reference.

In more detail, motor control 30 comprises a frequency converter 60 for providing phased energisation of the stator windings 38. A processing unit 62 such as a digital signal processing unit receives a current and a voltage signal of the stator windings 38 and determines in real time a variation in flux in each winding according to the following equation.

$$V = IR + L\,dI/dt + NA\,dB/dt$$

Where in relation to a stator winding, V is voltage, I is the current, R is the resistance, N is the number of turns, A is the cross-sectional area, L is the inductance and B is the magnetic flux density.

An angular position of the rotor can be determined according to the variation in flux and a position signal output to a control unit 64 for use in controlling the frequency converter 60 to achieve correct commutation.

Since vacuum pumps of the type described herein are required to be driven at high rotational speeds, the frequency of commutation of the stator windings must be commensurately high. The use of a rotor with four or more poles requires higher frequency commutation as compared to a two pole motor. Previously therefore it has not been considered desirable to adopt a vacuum pump, which is driven by a motor with a four pole rotor since the frequency of required commutation would be prohibitively high. However, such an increase in frequency has been found to have beneficial effects in a vacuum pump. As the pump housing 28 shown in FIG. 1 is typically made from an electrically conductive material, for instance an aluminium alloy, an increase in the frequency of the alternating magnetic field generated results in an increase in the attenuation effect of the housing by eddy-current shielding. Accordingly, the adoption of a four pole motor in a vacuum pump renders the vacuum pump more suitable for use with sensitive equipment.

When an alternating magnetic field is imposed on a pump housing made from a material of high electrical conductivity or high magnetic permeability, eddy currents are induced in the housing. These eddy currents create a further magnetic field which counteracts the original imposed field so that the magnetic field is reduced as it passes through the pump housing. The skin thickness $T_m$ of the pump housing is a measure of the distance through the housing over which the magnetic field is reduced by a ratio of "e" (approximately 2.72). Therefore, shielding is increased as the skin thickness is reduced. The skin thickness can be calculated according to the formula below.

$$t_m = \sqrt{\frac{\rho}{\pi \mu f}}$$

where $\rho$ is electrical resistivity, $\mu$ is magnetic permeability and f is the frequency of the time-varying magnetic field. For materials such as aluminium with low electrical resistivity or materials such as mild steel with high magnetic permeability (above 100 relative magnetic permeabilities), the skin thickness is relatively small and therefore the shielding effect is relatively large. The increased frequency of the four pole rotor further increases the shielding effect.

As described above, a four pole motor requires higher frequency commutation, which ordinarily increases iron losses in the stator. Iron losses $W_{FE}$ can be approximated according to the formula below.

$$W_{Fe} \alpha \text{Volume} \times B^2 \times \omega^2$$

where B is flux density and $\omega$ is commutation frequency.

As described above, a four pole motor requires higher frequency commutation, which will increase the iron losses in the stator. However, due to the non-overlapping winding arrangement shown in FIGS. 2 and 3 the copper losses are decreased by avoiding long end windings normally involved in an overlapping winding arrangement. The copper losses are decreased as the resistance of the winding is reduced as less wire is required to form the windings. This reduction in copper loss can be traded against a potential increase in stator iron loss to keep the total losses of the motor similar to the losses in a conventional two pole motor.

Stray magnetic fields are also reduced as the flux in a four pole motor travels a quarter rather than half the motor, and hence extends less radially (lower magnitude of flux density in radial direction). Additionally, stray magnetic fields are additionally reduced as commutation of the motor is calculated as shown in FIG. 5, and therefore hall effect sensors are not required. As described above in relation to the prior art, the use of hall effect sensors necessitates an extension of the rotor beyond the stator and leads to increased stray magnetic fields. A sensor-less motor is advantageous as it renders the motor more suitable for use with sensitive equipment, such as equipment for one of metrology, imaging or pattern-making. As an alternative to a sensor-less motor, an optical sensor may be used to determine rotation of the rotor and to transmit the determination to the motor control for control of commutation.

Figure 6:
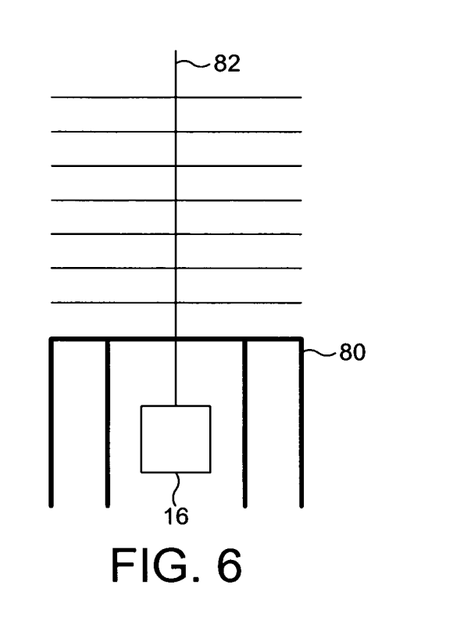
FIG. 6 is a schematic representation of a vacuum pump comprising a Holweck type vacuum pumping arrangement driven by the motor shown in FIG. 2.
Figure 7:
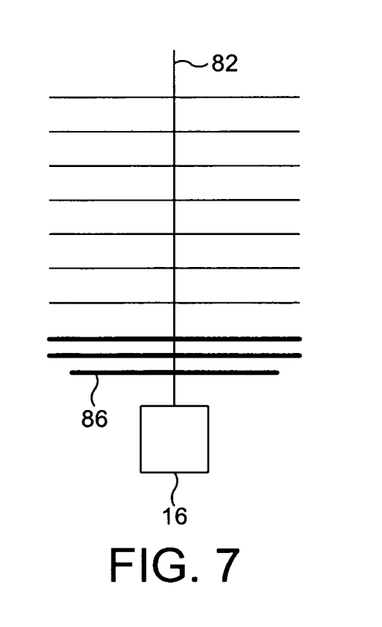
FIG. 7 is a schematic representation of a vacuum pump comprising a Gaede or Siegbahn type vacuum pumping arrangement driven by the motor shown in FIG. 2.
Figure 8:
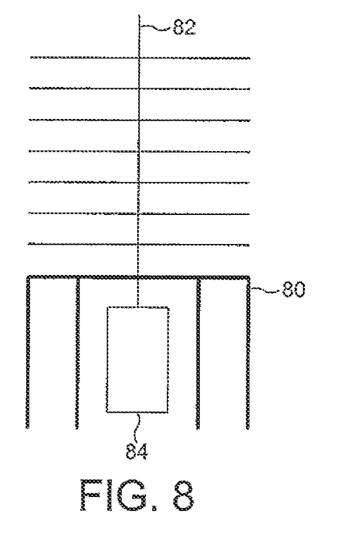
FIG. 8 is a schematic representation of a vacuum pump comprising a Holweck type vacuum pumping arrangement driven by a prior art motor.
Figure 9:
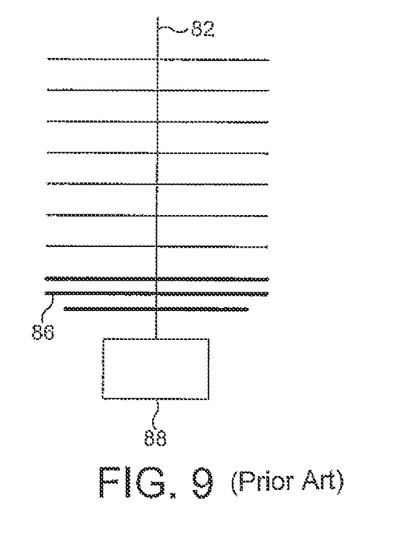
FIG. 9 is a schematic representation of a vacuum pump comprising a Gaede or Siegbahn type vacuum pumping arrangement driven by a prior art motor.

The motor 16 is reduced in both radial and axial dimension as compared to prior art motors and therefore as shown in FIGS. 6 and 7 as compared with FIGS. 8 and 9, motor 16 can be used both with Holweck type vacuum pumping mechanisms and with Gaede and Siegbahn type vacuum pumping mechanisms. Therefore it is not necessary to produce multiple different types of motors for different types of pumping mechanisms and thus manufacturing costs can be reduced. It is a further advantage that the reduced dimensions of motor 16 allow a more compact vacuum pump.

While the foregoing description and drawings represent the preferred embodiments of the present invention, it will be apparent to those skilled in the art that various changes and modifications may be made therein without departing from the true spirit and scope of the present invention.

The invention claimed is:

1. A vacuum pump comprising: a vacuum pumping mechanism rotatable by a shaft and a brushless motor for rotating said shaft, wherein said motor comprises:
   a permanent magnet rotor fixed relative to said shaft, said rotor having at least four poles;
   a stator fixed relative to a pump housing, said stator having non-overlapping stator coils; and
   motor control for selective energisation of said stator coils dependent on a relative position of said rotor and said stator so that said rotor can be rotated relative to said stator, and wherein said motor control is configured to energise said stator coils at a frequency which is sufficient to rotate said vacuum pumping mechanism at at least 20,000 revolutions per minute.

2. The vacuum pump as claimed in claim 1 wherein said vacuum pumping mechanism comprises a turbomolecular pumping mechanism.

3. The vacuum pump as claimed in claim 2 wherein said pumping mechanism comprises one of a Holweck, Gaede or Siegbahn pumping mechanism.

4. The vacuum pump as claimed in claim 1 wherein said motor control comprises an optical sensor for sensing said relative position of said rotor and said stator.

5. The vacuum pump as claimed in claim 1 wherein said motor control is configured to determine said relative position of said rotor and said stator by computation of a magnetic flux in said stator coils.

6. The vacuum pump as claimed in claim 5 wherein said computation of magnetic flux in said stator coils is computed by measurement of voltage and current in said stator coils.

7. The vacuum pump as claimed in claim 1 for equipment sensitive to magnetic interference.

8. The vacuum pump as claimed in claim 7 wherein said equipment is for one of metrology, imaging or pattern-making.

9. The vacuum pump as claimed in claim 1 comprising a pump housing made from a material of high electrical conductivity or high magnetic permeability.

10. The vacuum pump as claimed in claim 9 wherein said material is made from an aluminium alloy.

11. The vacuum pump as claimed in claim 1 further comprising a pump housing made from a material of high magnetic permeability.

12. The vacuum pump as claimed in claim 11 wherein said material of high magnetic permeability comprises steel.

13. The vacuum pump as claimed in claim 2 where in said motor control is configured to determine said relative position of said rotor and said stator by computation of a magnetic flux in said stator coils.

14. The vacuum pump as claimed in claim 3 wherein said motor control is configured to determine said relative position of said rotor and said stator by computation of a magnetic flux in said stator coil.

15. The vacuum pump as claimed in claim 14 wherein said computation of magnetic flux in said stator coils is computed by measurement of voltage and current in said stator coils.

16. The vacuum pump as claimed in claim 4 comprising a pump housing from a material of high electrical conductivity or high magnetic permeability.

17. The vacuum pump as claimed in claim 5 comprising a pump housing made from a material of high electrical conductivity or high magnetic permeability.

\* \* \* \* \*